United States Patent
Lobo et al.

(10) Patent No.: US 9,652,972 B1
(45) Date of Patent: May 16, 2017

(54) MAINTENANCE OF TELECOMMUNICATIONS NETWORK INFRASTRUCTURE BASED ON ALARM SCORING

(71) Applicant: Sprint Communications Company L.P., Overland Park, KS (US)

(72) Inventors: Shane A. Lobo, Ponte Vedra, FL (US); Brian D. Lushear, Winter Springs, FL (US); Seth T. Shelnutt, Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 165 days.

(21) Appl. No.: 14/668,986

(22) Filed: Mar. 26, 2015

(51) Int. Cl.
*G08B 29/00* (2006.01)
*G08B 25/00* (2006.01)

(52) U.S. Cl.
CPC .................... *G08B 25/008* (2013.01)

(58) Field of Classification Search
CPC .................................................. G08B 25/008
USPC .......................................................... 340/506
See application file for complete search history.

(56) References Cited

U.S. PATENT DOCUMENTS

| | | | | |
|---|---|---|---|---|
| 6,234,806 B1* | 5/2001 | Trenholm | ................ | G09B 7/04 434/322 |
| 2003/0221005 A1* | 11/2003 | Betge-Brezetz | ........ | H04L 41/22 709/224 |
| 2007/0222576 A1* | 9/2007 | Miller | ................ | H04L 41/0609 340/506 |
| 2011/0254680 A1* | 10/2011 | Perkinson | .............. | G08B 25/14 340/506 |
| 2015/0066435 A1* | 3/2015 | Basu | ........................ | H04Q 9/00 702/189 |
| 2015/0254969 A1* | 9/2015 | Bishop | ................ | H04L 41/0622 340/506 |

* cited by examiner

*Primary Examiner* — Qutbuddin Ghulamali

(57) ABSTRACT

A method for prioritized action of telecommunication network alarms in a telecommunication network management system. The method comprises setting, by an alarm severity scoring application executing on a computer, an initial alarm severity score for each of the plurality of alarms based on network classification and a geographical location of an alarm, wherein the network classification of the alarms is performed by a network classify application. The method further comprises evaluating, by the alarm severity scoring application executing on the computer, each of the alarms based on a plurality of weighting factors, determining an alarm severity score based on the evaluation and the initial alarm severity score for each of the alarms, and prioritizing actions for the alarms based on the alarm severity scores.

20 Claims, 4 Drawing Sheets

MAINTENANCE OF TELECOMMUNICATIONS NETWORK INFRASTRUCTURE BASED ON ALARM SCORING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A telecommunication network infrastructure may comprise base station controllers (BSCs), mobile switching centers (MSCs), telecommunication switches (e.g., digital multiplexing system (DMS) 100 switches, DMS 200 switches, DMS 250 switches, or ESS 5 switches), routers, home location register (HLR) servers, visitor location register (VLR) servers, policy and charging rules function (PCRF) servers, authentication-authorization-and-accounting (AAA) servers, billing servers, and/or some other network component. These network components may generate alarms, for example in the form of simple network management protocol (SNMP) traps, when encountering alarm events. Alternatively, the network components may generate alarms in a proprietary format that are transmitted to a network management system (NMS). Fixing the subject network component associated with an alarm may involve multiple steps such as identifying the alarm and subject network component, analyzing the alarm severity, forwarding the alarm to relevant department(s), sending technical personnel, resetting the subject network component, and/or some other step.

SUMMARY

In an embodiment, a method for prioritized action of telecommunication network alarms in a telecommunication network management system is disclosed. The method comprises setting, by an alarm severity scoring application executing on a computer, an initial alarm severity score for each of the plurality of alarms based on network classification and a geographical location of an alarm, wherein the network classification of the alarms is performed by a network classify application. The method further comprises evaluating, by the alarm severity scoring application executing on the computer, each of the alarms based on a plurality of weighting factors, determining an alarm severity score based on the evaluation and the initial alarm severity score for each of the alarms, prioritizing actions for the alarms based on the alarm severity scores, responsive to an alarm severity score being above a predefined threshold in a corresponding geographical region, resetting a network component that generated the alarm, and resets alarm severity scores of one or more of the alarms based on predefined rules.

In an embodiment, a system for prioritized action of telecommunication network alarms is disclosed. The system comprises a memory, a processor, and a network classify application stored in the memory that, when executed by the processor, classifies a plurality of alarms based on which part of a telecommunications network an alarm is associated with. The system further comprises an alarm severity scoring application stored in the memory that, when executed by the processor, sets an initial alarm severity score for each of the alarms based on the classification and a geographical location of the alarm, evaluates each of the alarms based on a plurality of weighting factors, and determines an alarm severity score based on the evaluation and the initial alarm severity score for each of the alarms. The alarm severity scoring application further prioritizes actions for the alarms based on the alarm severity scores, changes actions for the alarms based on the alarm severity scores, changes sequences of actions for the alarms based on the alarm severity scores, examines an escalation level of each of the alarms periodically, adjusts alarm severity scores of one or more of the alarms based on the periodic examination, responsive to an alarm severity score being above a predefined threshold, sends technical personnel to fix the alarm, and resets alarm severity scores of one or more of the alarms based on predefined rules.

In an embodiment, a method for prioritized action of telecommunication network alarms in a telecommunication network management system is disclosed. The method comprises classifying, by a network classify application executing on a computer, a plurality of alarms based on which part of a telecommunications network an alarm is associated with, setting, by an alarm severity scoring application executing on the computer, an initial alarm severity score for each of the alarms based on the classification and a geographical location of the alarm, and evaluating, by the alarm severity scoring application executing on the computer, each of the alarms based on a plurality of weighting factors. The method further comprises determining an alarm severity score based on the evaluation and the initial alarm severity score for each of the alarms, prioritizing actions for the alarms based on the alarm severity scores, and examining an escalation level of each of the alarms periodically. The method further comprises adjusting alarm severity scores of at least one of the alarms based on the periodic examination, responsive to an alarm severity score being above a predefined threshold: opening a ticket for the alarm, and sending technical personnel to fix the alarm, and resets alarm severity scores of one or more of the alarms based on predefined rules.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
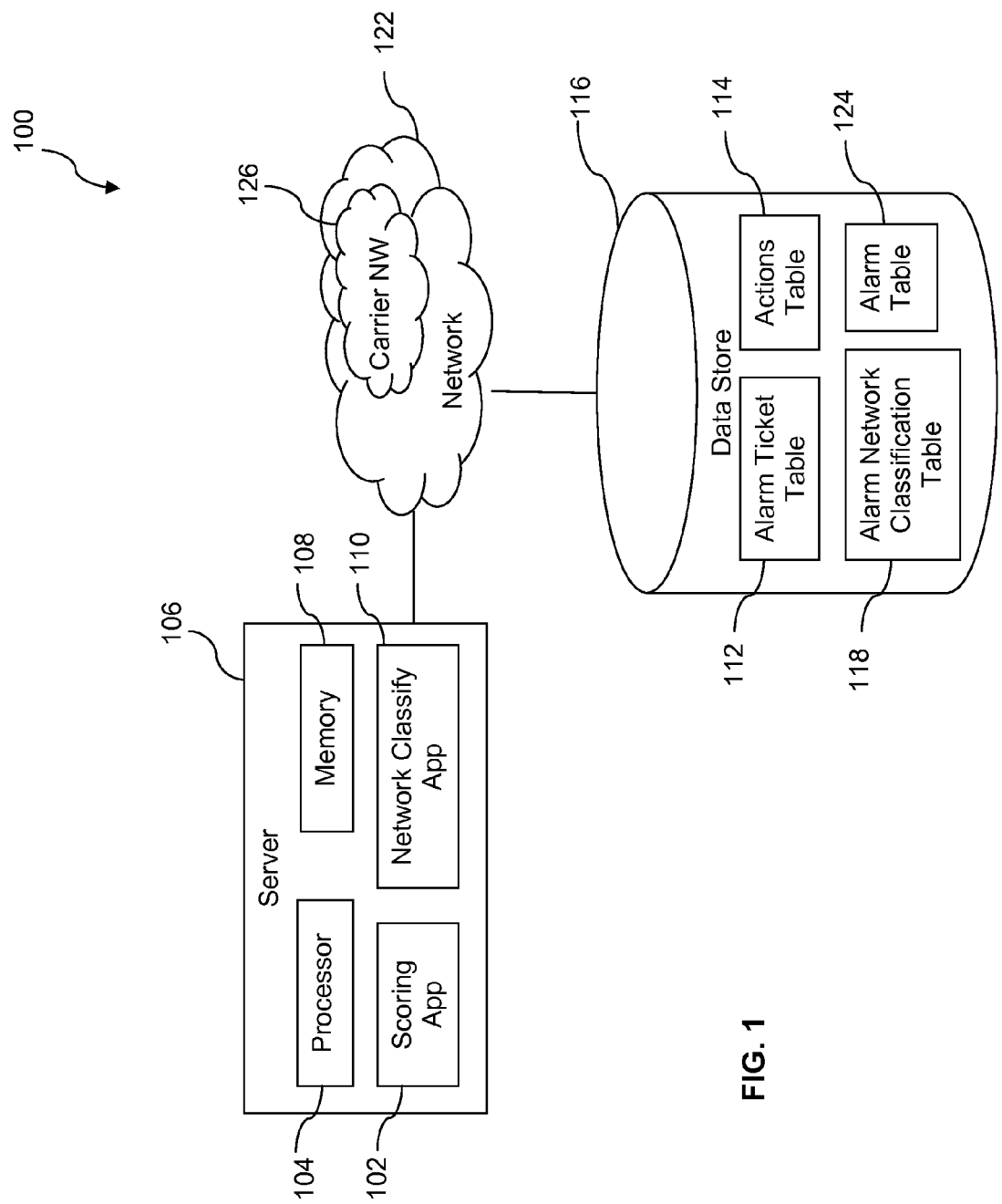
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunication network management platforms may be managed by third parties, for example a network device company or a network maintenance company. When a technical issue or difficulty occurs in a network, a network component in the network may generate an alarm, for example in the form of simple network management protocol (SNMP) traps. The alarm may be collected by a fault management platform. Personnel from different organizations that support the network may access the alarms through a user interface, open trouble tickets for alarms, and/or determine responses to solve the alarms depending on the situations. Currently alarms may be solved in a non-optimized order, or said in other words, network components in a network may be given the same treatment for technical difficulties. Alternatively, a few network components (e.g., network components that are classified as important network components) may be fixed with priority when they are associated with alarms. The rest of the network components in the network may be fixed in a non-optimized order, for example a temporal order as the alarms are generated. It is desirable to score a severity of alarms for telecommunication networks so that alarms can be fixed in an optimized order. The present disclosure teaches a system and method for prioritized action of telecommunication network alarms in a telecommunication network management system.

For example, a network classify application may be stored in a memory of a server maintained by a communication service provider that supports a network. When executed by a processor of the server, the network classify application may classify a plurality of telecommunication network alarms, for example based on which part of the network an alarm is associated with. The alarms may be imported by the network classify application or another application from a data store of a telecommunication network management platform, e.g. Netcool.

An alarm severity scoring application may be stored in the memory of the server or in a memory of another server maintained by the communication service provider. When executed by the processor of the subject server, the alarm severity scoring application may perform a variety of functionality to analyze the alarms, score the alarms, and/or determine actions for the alarms. An alarm severity score may represent a business impact to the communication service provider from a technical difficulty associated with a network component. Said in other words, an alarm severity score may take into consideration a magnitude of a technical problem and a magnitude of business impact of the technical problem. The alarm severity scores may be utilized for prioritizing and/or optimizing action orders for the alarms. The actions may be corrective actions commanded or assigned to be completed to restore the subject network equipment and/or network node to an unalarmed state. The alarm severity scores may also be utilized for changing actions or sequences of actions for the alarms.

For example, an initial alarm severity score may be set by the alarm severity scoring application for each of the alarms based on the classification and/or a geographical location of the alarm. Additionally, each of the alarms may be evaluated by the alarm severity scoring application based on a plurality of weighting factors. A weighting factor may be any of an alarm severity level, a number of calls to customer care associated with the alarm, call volume, an inventory level, an escalation level, a revenue value of the subject network component associated with the alarm, a public venue status, or another type of weighting factor. An inventory level may be one of a golden BTS level, an airport BTS level, a regular BTS level, a mobile switching center (MSC) level, a short message service (SMS) messaging component level, or another type of inventory level. In an embodiment, a golden BTS may be a more important BTS than a regular BTS, for example a BTS in a heavily populated urban area in a big city; an airport BTS may be a BTS serving an airport area. An escalation level may be a measure of how much an alarm severity level of an alarm has changed since the initial generation of the alarm and/or last examination of the alarm. Each weighting factor may be assigned with a weighting value. In an embodiment, a value of one weighting factor may be different from values of other weighting factors. A value of a weighting factor may represent the importance of the weighting factor.

An alarm severity score may be determined based on the evaluation and/or the initial alarm severity score for each of the alarms. The alarm severity score of an alarm may represent an initial alarm severity score and/or a plurality of weighting factors. Each weighting factor may be assigned with a weight, for example based on a status of the weighting factor of an associated alarm. In an embodiment, when a weighting factor is irrelevant for an alarm, a corresponding weight of the weighting factor may be assigned with a value of 0. In an embodiment, the alarm severity score of an alarm may be a sum of an initial alarm severity score and a plurality of products of the weighting factors and corresponding weights. Each product may be formed by multiplying a weighting factor with a corresponding weight. For example, $$\text{Severity Score} = \sum_{k=1}^{n} WF_k * \omega_k = WF_1 * \omega_1 + WF_2 * \omega_2 + \ldots + WF_n * \omega_n$$

$$\text{Sum} = \sum_{k=0}^{n} WF_k * \omega_k = WF_1 * \omega_1 + WF_2 * \omega_2 + \ldots + WF_n * \omega_n$$

$$\text{Sum} = \sum_{k=1}^{n} WF_k * \omega_k = WF_1 * \omega_1 + WF_2 * \omega_2 + \ldots + WF_n * \omega_n$$

where k designates an index number ranging from 1 to n, $WF_k$ designates a $k_{th}$ weighting factor, and $\omega_k$ designates a $k_{th}$ weight corresponding to the $k_{th}$ weighting factor $WF_k$. Additionally, a most current state before generation of an alarm may be examined for scoring the severity of the alarm.

Actions for the alarms may be prioritized based on the alarm severity scores. Action paths and/or sequences for alarms may be adjusted based on alarm severity scores. For example, when an alarm severity score of an alarm is above a predefined threshold, a ticket may be opened for the alarm and/or technical personnel may be sent to fix the alarm—intermediate analysis steps may be skipped. Alternatively, when an alarm severity score is above a predefined threshold, a ticket may be opened for the alarm and/or an associated network component of the alarm may be reset—again intermediate analysis steps may be skipped.

An escalation level of each of the alarms may be examined periodically. An escalation level may be a measure of how much an alarm severity level of an alarm has changed since the initial generation of the alarm and/or last examination of the alarm. Alarm severity scores of at least one of the alarms may be adjusted based on the periodic examination. This way, high alarm severity scores may be detected and/or fixed in time.

Turning now to FIG. 1, a communication system 100 is described. In an embodiment, the communication system 100 comprises a data store 116 and a server 106. The server 106 may comprise a processor 104, a memory 108, an alarm severity scoring application 102, and a network classify application 110. The data store 116 may comprise an alarm table 124, an alarm ticket table 112, an actions table 114, and an alarm network classification table 118. The server 106 may be communicatively coupled to a network 122 via a wireless or wired communication link. The data store 116 may also be communicatively coupled to the network 122. The network 122 may comprise any combination of private and public networks. The network 122 may comprise a carrier network 126 that is maintained by a communication service provider.

It is understood that the system 100 may comprise any number of data stores 116 and any number of servers 106. The server 106 and the data store 116 may be server computers. The server 106 and the data store 116 may be located in one computer—for example a server computer, in two different computers—for example, a server computer for the server 106 and another computer for the data store 116, in multiple different computers—for example, multiple server computers for the server 106 and other multiple computers for the data store 116, or in some other combination of computers. When the server 106 and the data store 116 are not located in one computer, the server 106 and the data store 116 may share the same wired or wireless local area network.

The network classify application 110 may be stored in the memory 108 of the server 106. When executed by the processor 104 of the server 106, the network classify application 110 may classify a plurality of telecommunication network alarms. The alarms may have been generated by various network components of the carrier network 126 and collected by a telecommunication network management platform (not shown), for example Netcool.

The network component may be any of a base station controller (BSC), a mobile switching center (MSC), a telecommunication switch (e.g., a digital multiplexing system (DMS) 100 switch, a DMS 200 switch, a DMS 250 switch, or an ESS 5 switch), a mobile management entity (MME), a serving gateway (SGW), a packet data network gateway (PDN-GW), a router, a home location register (HLR) server, a visitor location register (VLR) server, a RCRF server, an authentication-authorization-and-accounting (AAA) server, a billing server, or some other network component. The alarms may have been imported by the network classify application 110 or another application from a data store of the telecommunication network management platform into the alarm table 124. In an embodiment, the network classify application 110 classifies the alarms based on which part of the network an alarm is associated with.

Different parts of the network may be classified as short message service (SMS) messaging components, core network components, wireless radio access network components, voicemail components, or another part of a network. The network classify application 110 may periodically transmit the classification of alarms to the alarm severity scoring application 102. Alternatively, the network classify application 110 may transmit the classification of alarms to the alarm severity scoring application 102 upon request from the alarm severity scoring application 102. The network classification results of the alarms may be stored in the data store 116, for example in an alarm network classification table 118 in the data store 116.

The alarm severity scoring application 102 may be stored in the memory 108 of the server 106. When executed by the processor 104 of the server 106, the alarm severity scoring application 102 may perform a variety of functionality to analyze the alarms, score the alarms, and/or determine actions for the alarms. For example, the alarm severity scoring application 102 may set an initial alarm severity score for each of the alarms, evaluate each of the alarms based on a plurality of weighting factors, and/or determine an alarm severity score based on the evaluation and the initial alarm severity score for each alarm. The alarm severity scoring application 102 may also prioritize actions for the alarms, examine periodically an escalation level of each of the alarms, adjust alarm severity scores for alarms, and/or perform another type of functionality.

For example, the alarm severity scoring application 102 may set an initial alarm severity score for each of the alarms based on the classification (e.g. by the network classify application 110) and/or a geographical location of the alarm. In an embodiment, when an alarm associated with a base transceiver station (BTS) or an enhanced Node B (eNB) near a public venue that is generated during a public event is newly imported by the network classify application 110 or another application, a high level initial alarm severity score may be set by the alarm severity scoring application 102 for the alarm, for example a highest level initial alarm severity score. The eNB may alternatively be referred to in some contexts as a base transceiver station or a cell tower. A limited number of levels of initial alarm severity scores may be set by the alarm severity scoring application 102 for alarms that are newly imported into the system, e.g. three different levels, four different levels, or another limited number of levels.

The alarm severity scoring application 102 may evaluate each of the alarms based on a plurality of weighting factors. A weighting factor may be any of an alarm severity level, a number of calls to customer care, call volume, an inventory level, an escalation level, a revenue value, a public venue status, or another type of weighting factor. Each weighting factor may be assigned with a value. In an embodiment, individual weighting factors may have different values. A value of a weighting factor may represent the importance of the weighting factor. For example, the revenue value weighting factor may be assigned with a higher value than the call to customer care weighting factor. The alarm severity level may be different from an alarm severity score. The alarm severity level may have been assigned by the telecommunication network management platform when the alarm is first generated by a network component and/or is first collected by the telecommunication network management platform. The alarm severity level may indicate how severe a technical issue associated with an alarm is. The call volume may be a number of voice call attempts during a day before the evaluation or a number of data connection (e.g., long term evolution (LTE) or evolution data optimized (EVDO) data connection) attempts during a day before the evaluation. An inventory level may be one of a golden BTS level, an airport BTS level, a regular BTS level, a mobile switching center (MSC) level, a short message service (SMS) messaging component level, or another type of inventory level. The MSC may have a higher inventory level than any BTS. For example, the MSC may be assigned with a higher weight than any BTS.

The alarm severity scoring application 102 may determine an alarm severity score based on the evaluation and/or the initial alarm severity score for each of the alarms. Each weighting factor may be assigned with a weight, for example based on a status of the weighting factor of an associated alarm. For example, when a weighting factor is irrelevant for an alarm, a corresponding weight of the weighting factor may be assigned with a value of 0. In an embodiment, the alarm severity score of an alarm may be a sum of an initial alarm severity score and a plurality of products the weighting factors and corresponding weights. Each product may be formed by multiplying a weighting factor with a corresponding weight. For example, $$\text{Sum} = \sum_{k=0}^{n} WF_k * \omega_k = WF_1 * \omega_1 + WF_2 * \omega_2 + \ldots + WF_n * \omega_n$$

$$\text{Sum} = \sum_{k=1}^{n} WF_k * \omega_k = WF_1 * \omega_1 + WF_2 * \omega_2 + \ldots + WF_n * \omega_n,$$

where k designates an index number ranging from 1 to n, $WF_k$ designates a $k_{th}$ weighting factor, and $\omega_k$ designates a $k_{th}$ weight corresponding to the $k_{th}$ weighting factor $WF_k$. In an embodiment, an alarm associated with a BTS with a high voice call volume may be assigned with a higher weight than a BTS with a lower voice call volume for the call volume weighting factor.

In an embodiment, an alarm severity score of each of the alarms may be converted by the alarm severity scoring application 102 into an alarm severity percentile rank, for example based on alarm severity scores of network components in a geographic region. An alarm severity score of an alarm may be converted into a percentile rank by ranking alarm severity scores associated with network components in the same geographic area. For example, an alarm severity score of 3,500 may be at the upper $5^{th}$ percentile rank among alarm severity scores associated with network components in Orlando, Fla. area.

The alarm severity scoring application 102 may determine actions for alarms, for example based on the corresponding alarm severity scores. Actions may comprise further analysis, forwarding the alarm to a relevant department/organization, sending technical personnel, opening a trouble ticket, resetting the subject network component, and/or some other action relevant to analyze or solve an alarm event. Actions for alarms may be stored in the data store 116, for example in the actions table 114 in the data store 116. The alarm severity scoring application 102 may prioritize actions for the alarms based on their corresponding alarm severity scores. In an embodiment, when an alarm severity score or a percentile rank of the alarm severity score is above a predefined threshold, the alarm severity scoring application 102 may open an alarm ticket for the alarm and/or send technical personnel to fix the alarm. For example, for the alarm at the upper $5^{th}$ percentile rank in Orlando area, technical personnel may be sent to fix the alarm without intermediate analysis and/or action.

Alarm tickets may be stored in the data store 116, for example in the alarm ticket table 112 in the data store 116. When a ticket is opened for an alarm, a ticket severity level may be assigned to the ticket. A ticket severity level of an alarm may be adjusted based on a corresponding alarm severity score of the alarm. In an embodiment, the ticket severity level may be adjusted to indicate the alarm severity score of the alarm.

The alarm severity scoring application 102 may periodically examine an escalation level of each of the alarms, for example every hour, every five hours, every ten hours, or at some other periodic interval. An escalation level may be a measure of how much an alarm severity level of an alarm has changed since the initial generation of the alarm and/or last examination of the alarm. The alarm severity scoring application 102 may adjust alarm severity scores of one or more of the alarms based on the periodic examination. For example, when one customer calls customer care to complain about a network component associated with an alarm, the call may be recorded and/or an escalation level of the alarm may be increased by a predefined amount. When another customer calls customer care to complain about the same network component associated with the same alarm, the call may be recorded and/or the escalation level of the alarm may be increased by the same predefined amount again. When the alarm severity scoring application 102 examines the escalation level of the alarm, an alarm severity score of the alarm may be increased based on the escalation level.

Figure 2:
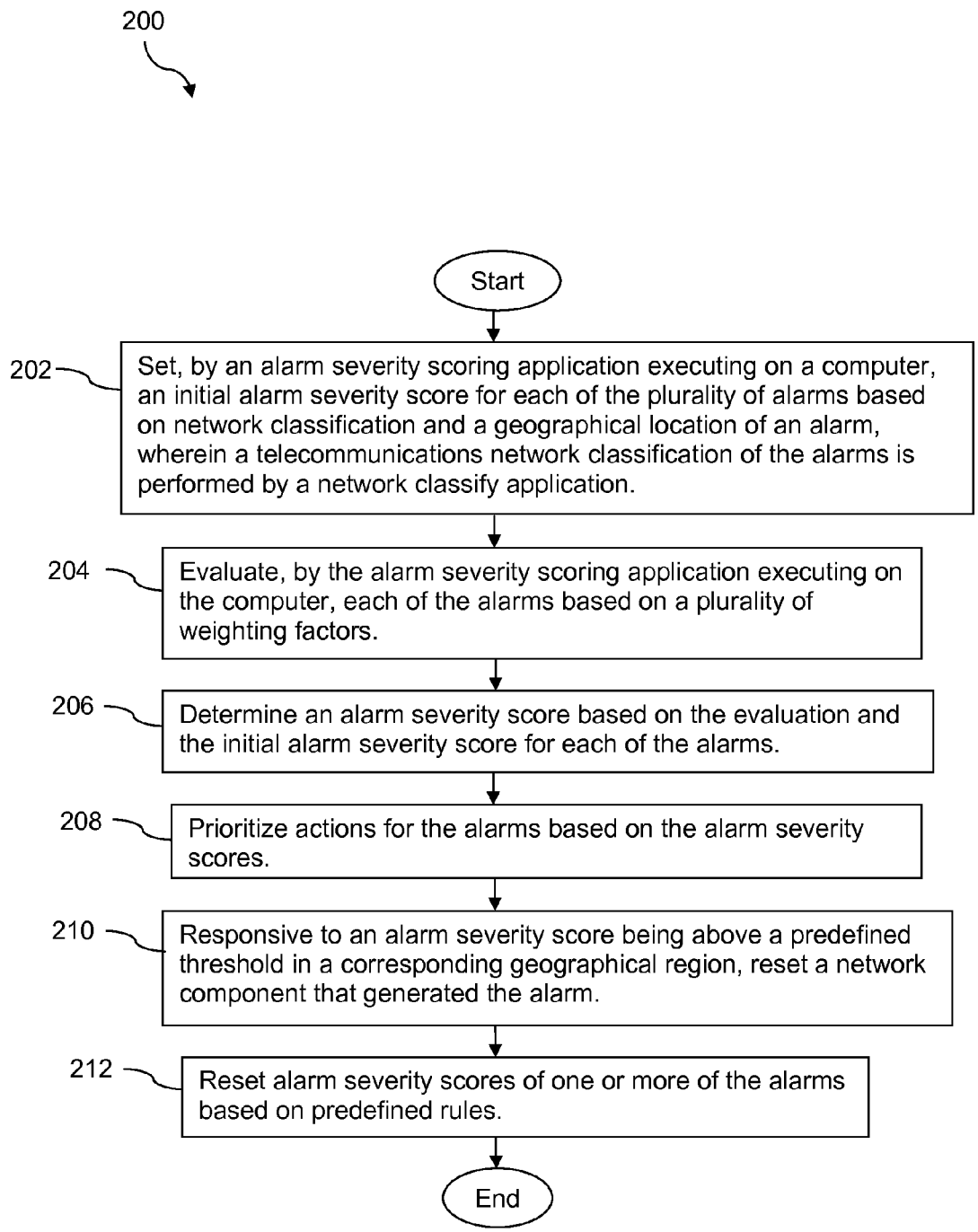
FIG. 2 is a flow chart illustrating a method according to an embodiment of the disclosure.

Turning now to FIG. 2, a method 200 is described. At block 202, an initial alarm severity score for each of the plurality of alarms is set by an alarm severity scoring application 102 executing on a computer based on network classification and a geographical location of an alarm, wherein the network classification of the alarms is performed by a network classify application. At block 204, each of the alarms is evaluated by the alarm severity scoring application executing on the computer based on a plurality of weighting factors. At block 206, an alarm severity score is determined based on the evaluation and the initial alarm severity score for each of the alarms. At block 208, actions are prioritized for the alarms based on the alarm severity scores. At block 210, when an alarm severity score is above a predefined threshold in a corresponding geographical region, a network component that generated the alarm is reset. At block 212, alarm severity scores of one or more of the alarms are reset based on predefined rules. For example alarm severity scores may be reset periodically, upon an administrator command, or based on other predefined rules.

Figure 3:
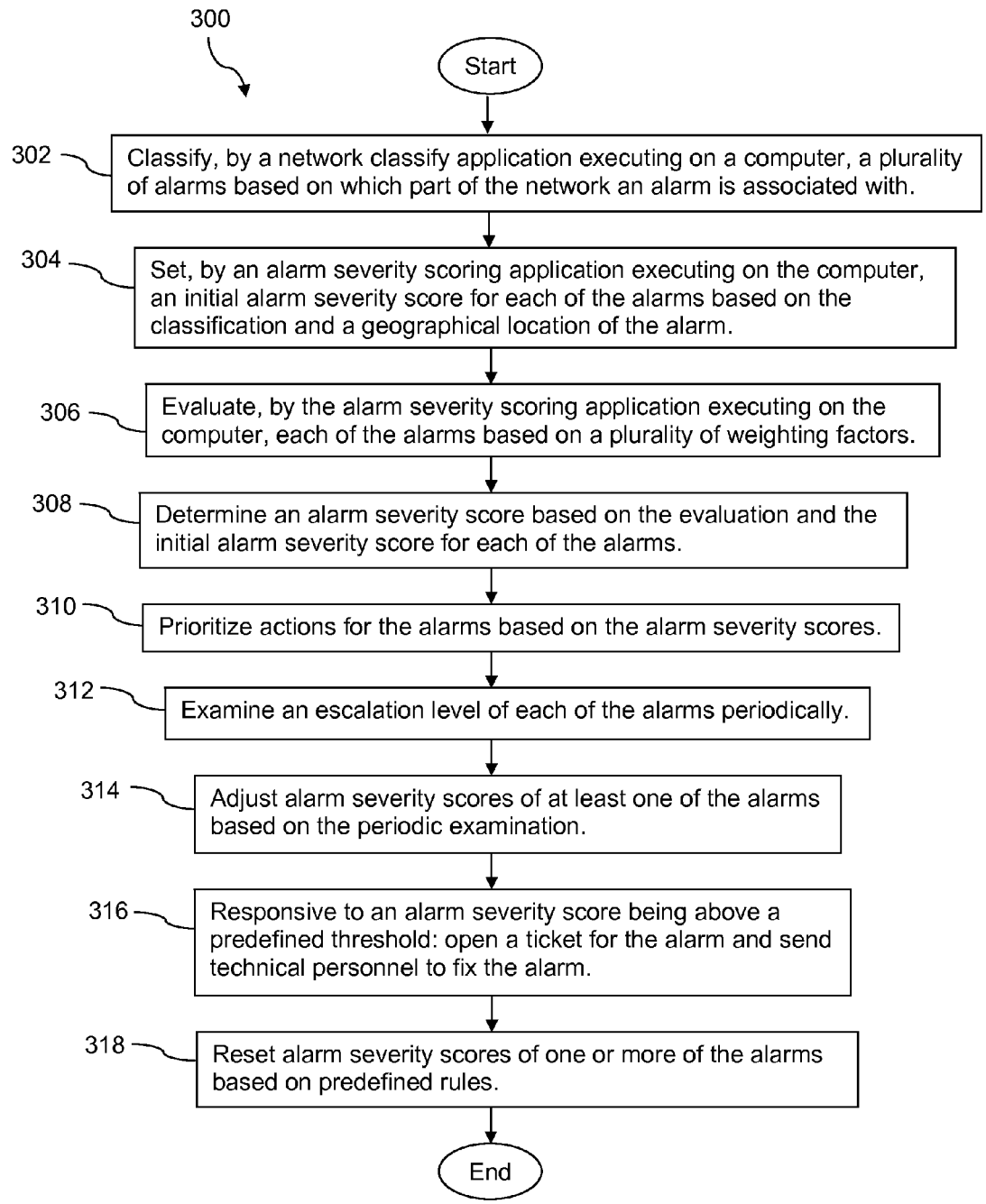
FIG. 3 is a flow chart illustrating another method according to an embodiment of the disclosure.

Turning now to FIG. 3, a method 300 is described. At block 302, a plurality of alarms are classified by a network classify application executing on a computer based on which part of a telecommunications network an alarm is associated with. For example, the alarms may be classified by the network classify application 110 based on which part of the network an alarm is associated with. Different parts of the network may comprise short message service (SMS) messaging components, core network components, wireless radio access network components, voicemail components, or another part of a network. At block 304, an initial alarm severity score is set by an alarm severity scoring application executing on the computer for each of the alarms based on the classification and a geographical location of the alarm. For example, an initial alarm severity score may be set by the alarm severity scoring application 102 for each of the alarms based on the classification and/or a geographical location of the alarm.

At block 306, each of the alarms is evaluated by the alarm severity scoring application 102 executing on the computer based on a plurality of weighting factors. At block 308, an alarm severity score is determined based on the evaluation and the initial alarm severity score for each of the alarms. At block 310, actions are prioritized for the alarms based on the alarm severity scores. At block 312, an escalation level of each of the alarms is examined periodically. At block 314, alarm severity scores of at least one of the alarms are adjusted based on the periodic examination. At block 316, when an alarm severity score is above a predefined threshold a ticket is opened for the alarm and technical personnel are sent to fix the alarm. At block 318, alarm severity scores of one or more of the alarms are reset based on predefined rules.

Figure 4:
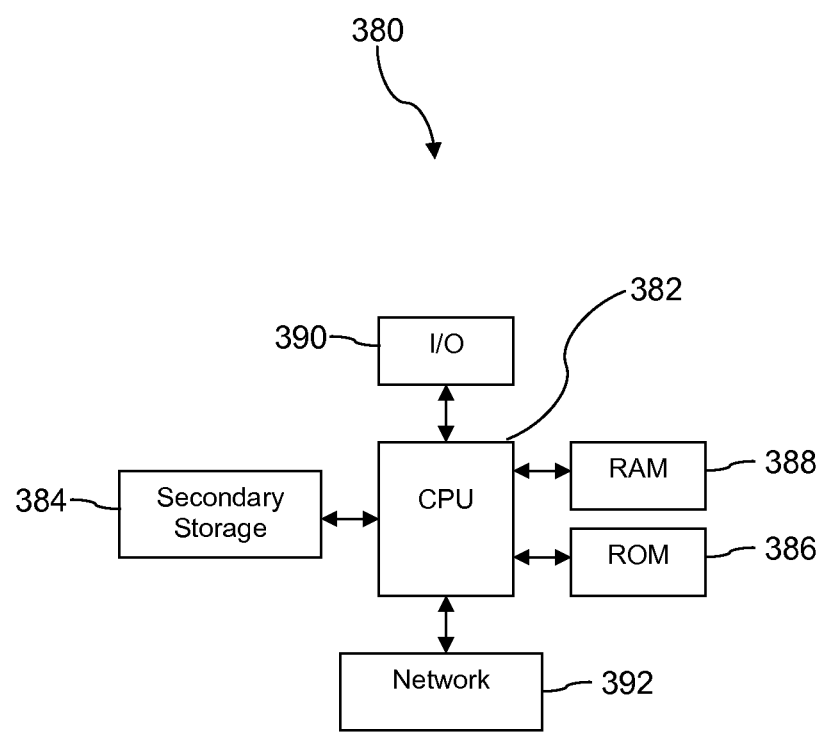
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A method for prioritized action of telecommunication network alarms in a telecommunication network management system, comprising:
   generating, by each of a plurality of network components in a telecommunication network, a plurality of network alarms, the plurality of network alarms corresponding to a technical issue occurring within at least one of the plurality of network components, wherein the plurality of network components include at least one of a base station controller, mobile switching center, telecommunication switches, digital multiplexing system switches, routers, home location register servers, or visitor location register servers;

collecting, by a fault management platform with a processor, the plurality of network alarms in a data store coupled to the telecommunication network;

importing, by a network server executing a network classify application with a processor, the plurality of network alarms within the data store into an alarm table;

classifying, by the network classify application executing on the network server, the plurality of network alarms as corresponding to at least one of short message service messaging components, core network components, wireless radio access network components, or voicemail components;

transmitting, by the network classify application to an alarm severity scoring application executing on the network server, classifications of the plurality of network alarms;

setting, by the alarm severity scoring application executing on the network server, an initial alarm severity score for each of the plurality of network alarms based on network classification and a geographical location of a corresponding network alarm, wherein the network classification of the plurality of network alarms is performed by the network classify application;

evaluating, by the alarm severity scoring application executing on the network server, each of the plurality of network alarms based on a plurality of weighting factors;

determining an alarm severity score based on the evaluation and the initial alarm severity score for each of the plurality of network alarms;

prioritizing actions for the plurality of network alarms based on the alarm severity scores;

responsive to an alarm severity score for a network alarm of the plurality of network alarms being above a predefined threshold in a corresponding geographical region:

resetting, by the network server via the telecommunication network, at least one of the plurality of network components that generated the network alarm, and resetting the alarm severity scores of one or more of the plurality of network alarms based on predefined rules.

2. The method of claim 1, further comprising, examining an escalation level of each of the plurality of network alarms periodically.

3. The method of claim 1, further comprising, adjusting alarm severity scores of the plurality of network alarms based on the periodic examination.

4. The method of claim 1, wherein a most current state before generation of one of the plurality of network alarms is examined for scoring a severity of the one of the plurality of network alarms.

5. The method of claim 1, wherein a weighting factor is any of an alarm severity level, a number of calls to customer care associated with the alarm, call volume, an inventory level, an escalation level, a revenue value of the subject network component associated with the alarm, or a public venue status.

6. A system for prioritized action of telecommunication network alarms, comprising:

a network server communicatively coupled to a plurality of network components via a telecommunication network, the network server comprising:

a non-transitory memory;

a processor;

a network classify application stored in the non-transitory memory that, when executed, by the processor:

imports, from within a data store, a plurality of network alarms into an alarm table, classifies the plurality of network alarms based on which part of the telecommunications network each of the plurality of network alarms is associated with, wherein the plurality of network alarms is classified as at least one of short message service messaging components, core network components, wireless radio access network components, or voicemail components, receives a request to transmit classifications for each of the plurality of network alarms, in response to the request, transmits the classifications for each of the plurality of network alarms; and an alarm severity scoring application stored in the non-transitory memory that, when executed, by the processor:

transmits the request to the network classify application for each of the plurality of network alarms, in response to transmission of the request, receives the classifications of the plurality of network alarms, sets an initial alarm severity score for each of the plurality of network alarms based on the classification and a geographical location of each network alarm, evaluates each of the plurality of network alarms based on a plurality of weighting factors, wherein a weighting factor is any of an alarm severity level, a number of calls to a customer care system that are each associated with at least one of the plurality of network alarms, call volume corresponding to network components, an inventory level of network components that is maintained in a data store, an escalation level, a revenue value of a subject network component associated with one of the plurality of network alarms, or a public venue status, determines an alarm severity score based on the evaluation and the initial alarm severity score for each of the plurality of network alarms, prioritizes actions for the plurality of network alarms based on the alarm severity scores, changes actions for the plurality of network alarms based on the alarm severity scores, changes sequences of actions for the plurality of network alarms based on the alarm severity scores, examines an escalation level of each of the plurality of network alarms periodically, adjusts alarm severity scores of one or more of the plurality of network alarms based on the periodic examination, responsive to an alarm severity score for a network alarm of the plurality of network alarms being above a predefined threshold, opens a ticket in a data store corresponding to the network alarm and sends a message to a user interface accessible to a technical personnel to fix the network alarm, reset a network component that generated one or more of the plurality of network alarms, and reset the alarm severity scores of one or more of the network alarms based on predefined rules.

7. The system of claim 6, wherein an alarm severity score of each of the plurality of network alarms is converted into an alarm severity percentile rank based on alarm severity scores of network components in a geographic region.

8. The system of claim 6, wherein a ticket severity level of one of the plurality of network alarms is adjusted based on a corresponding alarm severity score of the one of the plurality of alarms.

9. The system of claim 6, wherein a most current state before generation of one of the plurality of alarms is examined for scoring a severity of the one of the plurality of network alarms.

10. The system of claim 6, wherein the actions are corrective actions commanded to be completed to restore the subject network component to an unalarmed state.

11. The system of claim 10, wherein when one customer calls customer care to complain about a network component associated with one of the plurality of network alarms, an alarm severity score of the one of the plurality of alarms is increased by a predefined amount.

12. The system of claim 10, wherein the alarm severity score of each of the plurality of network alarms is a sum of products of each pair of the weighting factors and corresponding weights.

13. The system of claim 6, wherein a network alarm that is associated with a base transceiver station near a public venue and generated during a public event is set with a high level initial alarm severity score.

14. A method for prioritized action of telecommunication network alarms in a telecommunication network management system, comprising:
generating, by each of a plurality of network components in a telecommunication network, a plurality of network alarms, the plurality of network alarms corresponding to a technical issue occurring within at least one of the plurality of network components, wherein the plurality of network components include at least one of a base station controller, mobile switching center, telecommunication switches, digital multiplexing system switches, routers, home location register servers, or visitor location register servers;
collecting, by a fault management platform with a processor, the plurality of network alarms in a data store coupled to the telecommunication network;
importing, by a network server executing a network classify application with a processor, the plurality of network alarms into an alarm table;
classifying, by the network classify application executing on the network server, the plurality of network alarms based on which part of the telecommunication network each network alarm is associated with;
setting, by an alarm severity scoring application executing on the network server, an initial alarm severity score for each of the plurality of network alarms based on the classification and a geographical location of a corresponding network alarm;
evaluating, by the alarm severity scoring application executing on the network server, each of the plurality of network alarms based on a plurality of weighting factors;
determining an alarm severity score based on the evaluation and the initial alarm severity score for each of the plurality of network alarms;
prioritizing actions for the plurality of network alarms based on the alarm severity scores;
examining an escalation level of each of the plurality of network alarms periodically;
adjusting alarm severity scores of at least one of the plurality of network alarms based on the periodic examination;
responsive to an alarm severity score for a network alarm of the plurality of network alarms being above a predefined threshold:
opening, via the telecommunication network, a ticket in a data store for the network alarm, and
sending a message to a user interface accessible by a technical personnel to fix the network alarm; and
resetting, by the network server, at least one of the network components that generated one of the plurality of network alarms and resetting the alarm severity scores of one or more of the plurality of network alarms based on predefined rules.

15. The method of claim 14, wherein a weighting factor is any of an alarm severity level, a number of calls to customer care associated with the alarm, call volume, an inventory level, an escalation level, a revenue value of the subject network component associated with the alarm, or a public venue status.

16. The method of claim 15, wherein an inventory level is one of a golden base transceiver station (BTS) level, an airport BTS level, a regular BTS level, a mobile switching center (MSC) level, or a short message service (SMS) messaging component level.

17. The method of claim 14, wherein an escalation level is a measure of how much an alarm severity level of one of the plurality of network alarms has changed since the initial generation of the one of the plurality of network alarms.

18. The method of claim 14, wherein action paths for the plurality of network alarms are adjusted based on alarm severity scores.

19. The method of claim 14, wherein different parts of the telecommunication network comprise short message service (SMS) messaging components, core network components, wireless radio access network components, or voicemail components.

20. The method of claim 14, wherein when one customer calls customer care to complain about a network component associated with one of the plurality of network alarms, an alarm severity score of the one of the plurality of network alarms is increased by a predefined amount.

* * * * *